United States Patent Office 2,711,304
Patented June 21, 1955

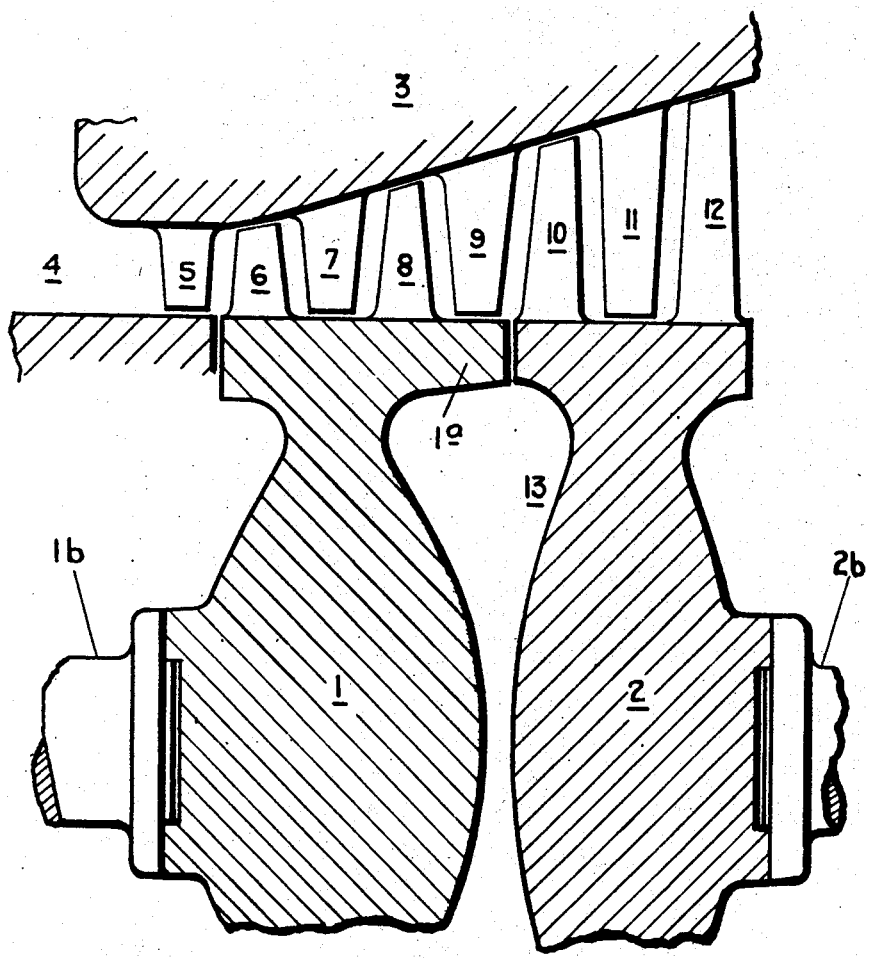

2,711,304

PLURAL STAGE GAS TURBINE

Alec Burton Mitchell, London, England, assignor to The English Electric Company Limited, London, England, a British company Application January 25, 1949, Serial No. 72,680

Claims priority, application Great Britain January 30, 1948

4 Claims. (Cl. 253—69)

The invention relates to gas turbine plant comprising independently rotatable turbine rotors arranged in series flow and in alignment with one another in a common casing, the first row of stator blades of the downstream turbine being arranged immediately after the last row of rotor blades of the upstream turbine so as to avoid any losses due to a circuitous path of the gases from the exhaust of the upstream turbine to the entry of the downstream turbine.

A typical example of such a gas turbine plant comprises a charging turbine driving the compressor for the combustion air of the plant, and an independently rotatable power turbine for the useful power output arranged in series flow arrangement, the charging turbine forming the high pressure or upstream stage, and the power turbine forming the low pressure or downstream stage.

According to the invention the first row of stator blades of the downstream turbine is arranged over the rotor of the upstream turbine.

In order that the invention be better understood and readily carried into effect, an embodiment thereof will now be described with reference to the accompanying drawing which is a diagrammatic axial section through part of a gas turbine embodying the invention.

The rotor 1 of the charging turbine and the rotor 2 of the power turbine are arranged co-axially but independently rotatable about their axes in a common casing 3. The combustion gases arriving from a convergent annular nozzle 4 are directed by the first row of stator blades 5 onto the first row of rotor blades 6 of the charging turbine, followed in the present embodiment by a second row of stator blades 7 and a second row of rotor blades 8.

A shoulder 1a of the rotor disc 1 of the charging turbine extends axially beyond the last row of rotor blades 8, and the first row of stator blades 9 of the power turbine is arranged immediately adjacent the said last row of rotor blades 8, i. e. over the shoulder 1a of the charging turbine rotor.

This row of stator blades 9 is followed by the first row of rotor blades 10 of the power turbine and, in the present embodiment, by another row of stator blades 11 and another row of rotor blades 12.

The upstream thrust of purely axial compressors, axial compressors having a radial final stage, and single sided radial compressors is usually greater than the downstream thrust of the charging turbine so that where the turbine is directly, and rigidly, coupled to the compressor, there is a resultant upstream thrust. Thus, according to the invention, by making the first stator blades 9 of the power turbine a reaction blading and arranging them over the shoulder 1a of the charging turbine disc 1, the pressure in the space 13 between charging turbine disc 1 and power turbine disc 2 is reduced by an amount equal to the pressure drop across the said stator blading 9. Thereby the pressure after the charging turbine is reduced which increases the downstream thrust of the charging turbine and reduces the resultant upstream thrust on the common thrust bearing of the compressor and its charging turbine. It also reduces the downstream thrust of the power turbine.

What I claim as my invention and desire to secure by Letters Patent is:

1. A gas turbine comprising a common casing, rows of stator blades fitted into said casing, two mechanically independent separate shafts journaled in alignment with and axially spaced from each other for rotation independently of each other in said casing, an upstream turbine rotor disc and a downstream turbine rotor disc each arranged on one of the said separate shafts and in series flow with one another in said casing the said upstream turbine rotor disc having a downstream rim extension, the first row of stator blades of the downstream turbine being reaction blading arranged immediately over the said rim extension of the rotor disc of the upstream turbine, said turbine rotor discs being axially spaced from each other.

2. A gas turbine comprising a high pressure charging turbine rotor disc having a downstream rim extension, a low pressure power turbine rotor disc arranged in series flow with the said high pressure turbine rotor disc, a common turbine casing enclosing both the said turbine rotor discs, two mechanically independent separate shafts journalled in alignment with and axially spaced from each other for rotation independently of each other in said casing and each carrying one of the said turbine rotor discs, rows of stator blades arranged in the said casing, the first row of stator blades of the said low pressure turbine being reaction blading arranged immediately over the said rim extension of the rotor disc of the said high pressure turbine, said turbine rotor discs being axially spaced from each other.

3. A gas turbine comprising a common casing, two mechanically independent separate shafts journaled in alignment with and axially spaced from each other for rotation independently of each other in said casing, rows of stator blades fitted into said casing, a high pressure turbine rotor disc mounted on one of the said shafts, a rim arranged on said rotor disc, rotor blades fitted to said rim, an axial extension of said rim downstream of the rotor blades thereof, a low pressure turbine rotor disc mounted on the other one of the said shafts and arranged in series flow with the said high pressure turbine rotor disc, the first row of stator blades for the said low pressure turbine rotor disc being reaction blading arranged immediately over the said axial extension of the high pressure turbine rotor disc, said turbine rotor discs being axially spaced from each other.

4. A gas turbine comprising a common casing, two mechanically independent separate shafts journaled in alignment with and axially spaced from each other for rotation independently of each other in the said casing, rows of stator blades fitted into said casing, a high pressure turbine rotor disc mounted on one of the said shafts, a rim arranged on said rotor disc, rotor blades fitted to said rim, an axial extension of said rim downstream of the rotor blades thereof, a row of reaction stator blades arranged immediately over the said extension, and a low pressure turbine rotor disc mounted on the other one of the said shafts and arranged in alignment with the said high pressure turbine rotor disc in operative relation to the said reaction stator blades, said turbine rotor discs being axially spaced from each other.

References Cited in the file of this patent

UNITED STATES PATENTS

| 1,398,124 | Cake | Nov. 22, 1921 |
| 1,597,467 | Hodgkinson | Aug. 24, 1926 |
| 2,312,995 | Anxionnaz | Mar. 2, 1943 |
| 2,375,006 | Larrecq | May 1, 1945 |
| 2,399,046 | Larrecq | Apr. 23, 1946 |
| 2,476,179 | Cameron | July 12, 1949 |
| 2,476,218 | Prime | July 12, 1949 |
| 2,483,616 | Bergstedt | Oct. 4, 1949 |
| 2,505,660 | Baumann | Apr. 25, 1950 |

FOREIGN PATENTS

| 586,553 | Great Britain | 1947 |